United States Patent
Iwata

(10) Patent No.: US 12,532,077 B2
(45) Date of Patent: Jan. 20, 2026

(54) CONTROL APPARATUS, IMAGING SYSTEM, CONTROL METHOD, AND STORAGE MEDIUM

(71) Applicant: CANON KABUSHIKI KAISHA, Tokyo (JP)

(72) Inventor: Takuya Iwata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 18/504,017

(22) Filed: Nov. 7, 2023

(65) Prior Publication Data
US 2024/0155237 A1   May 9, 2024

(30) Foreign Application Priority Data
Nov. 9, 2022   (JP) .................. 2022-179917

(51) Int. Cl.
*H04N 23/69* (2023.01)
*H04N 23/61* (2023.01)
*H04N 23/63* (2023.01)

(52) U.S. Cl.
CPC ............. *H04N 23/69* (2023.01); *H04N 23/61* (2023.01); *H04N 23/635* (2023.01)

(58) Field of Classification Search
CPC .... H04N 23/61; H04N 23/635; H04N 23/611; H04N 23/69; H04N 23/695
USPC ...................................................... 348/222.1
See application file for complete search history.

(56) References Cited

U.S. PATENT DOCUMENTS

| | | | |
|---|---|---|---|
| 9,165,364 B1 * | 10/2015 | Kishi | G06T 7/74 |
| 11,010,905 B2 * | 5/2021 | Dehghan | G06T 7/248 |
| 11,265,478 B2 * | 3/2022 | Tsubusaki | H04N 23/611 |
| 2010/0026809 A1 * | 2/2010 | Curry | H04N 23/698 348/157 |
| 2015/0294176 A1 * | 10/2015 | Kishi | G08B 13/19608 348/169 |
| 2016/0021316 A1 | 1/2016 | Tsubusaki | |
| 2016/0301854 A1 * | 10/2016 | Kato | G02B 15/143 |
| 2017/0155842 A1 * | 6/2017 | Takayanagi | H04N 23/6811 |
| 2021/0195113 A1 * | 6/2021 | Tsubusaki | H04N 23/682 |
| 2022/0256085 A1 * | 8/2022 | Sugaya | H04N 23/687 |

(Continued)

FOREIGN PATENT DOCUMENTS

| | | |
|---|---|---|
| CN | 103631698 A | 3/2014 |
| CN | 108206941 A | 6/2018 |
| CN | 114827455 A | 7/2022 |

(Continued)

*Primary Examiner* — Pritham D Prabhakher
(74) *Attorney, Agent, or Firm* — Canon U.S.A., Inc. IP Divison

(57) ABSTRACT

A control apparatus for controlling an angle of view of an imaging apparatus includes an acquisition unit for acquiring an image captured by the imaging apparatus, a detection unit for detecting an object from the image, and a control unit for performing angle of view control on the imaging apparatus based on a difference between a position of the object in the image and a target position in the image. Whether to perform the angle of view control is determined based on the difference and at least one threshold for the difference. The angle of view control is performed by switching a plurality of control modes where control speed of the angle of view control is different based on any of a size of the object, the target position, and the at least one threshold.

16 Claims, 13 Drawing Sheets

(56) References Cited

U.S. PATENT DOCUMENTS

2022/0351546 A1* 11/2022 Yamashita ........... G06V 40/107

FOREIGN PATENT DOCUMENTS

| JP | 2001076156 A | 3/2001 |
| JP | 2016025376 A | 2/2016 |
| JP | 2019068183 A | 4/2019 |

* cited by examiner

FIG.4
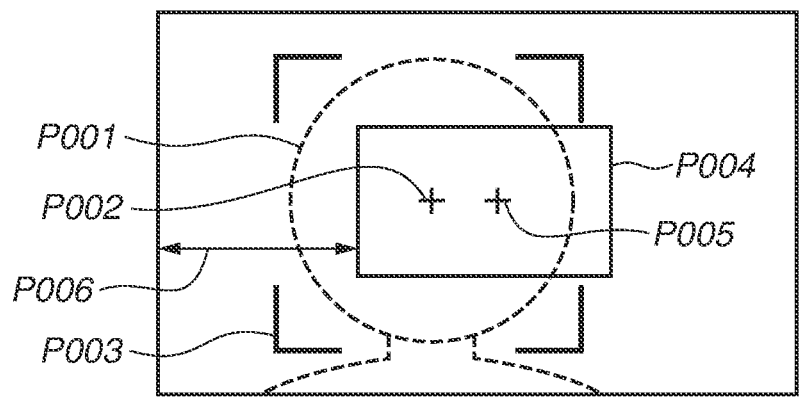
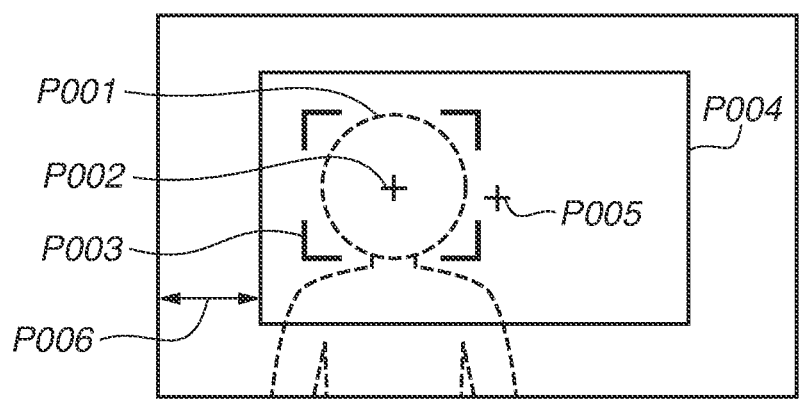
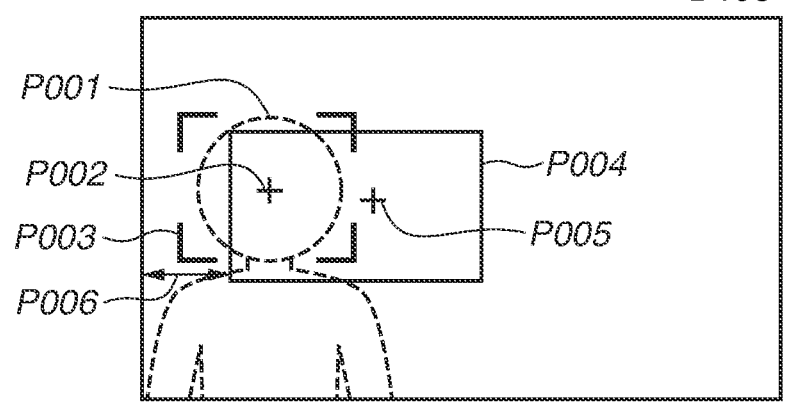

FIG.5
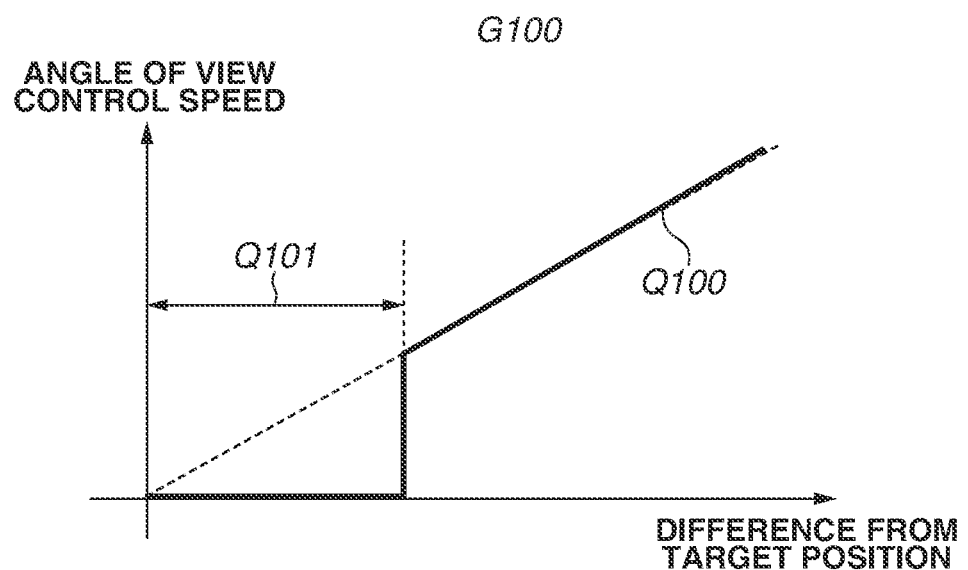
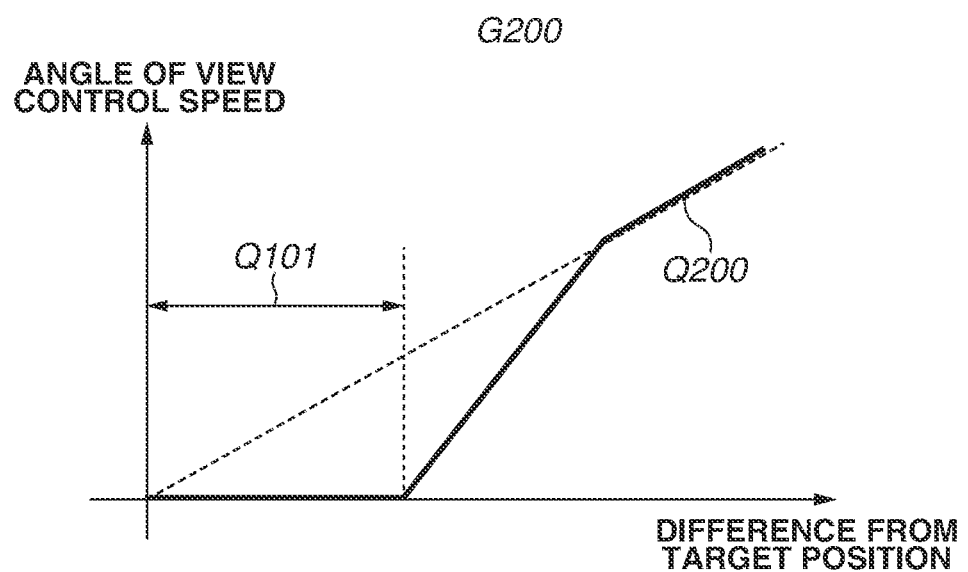

FIG.6
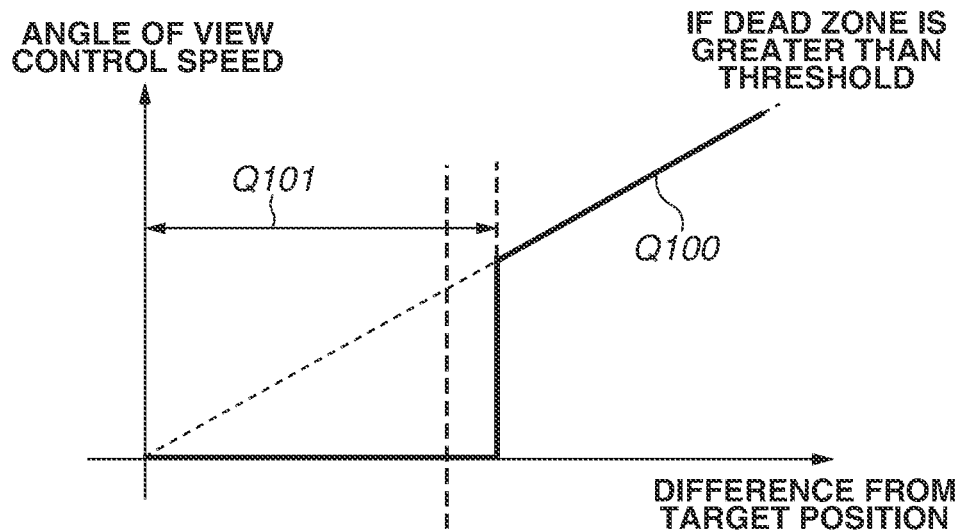
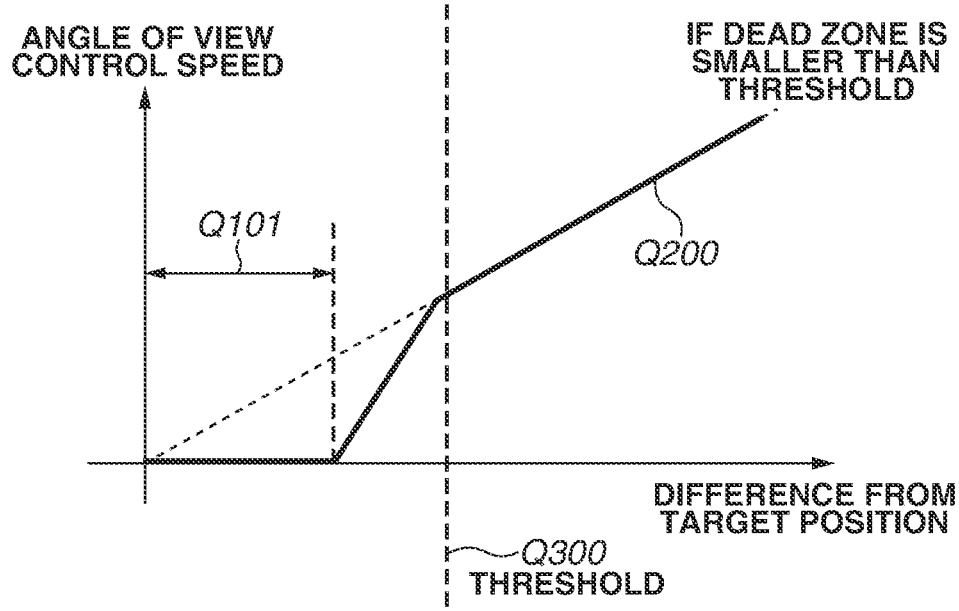

FIG.10
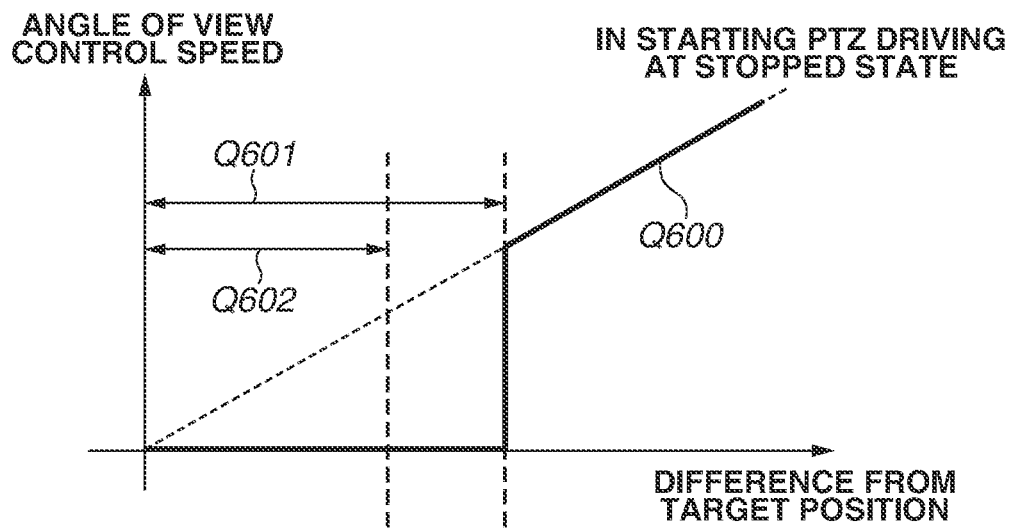
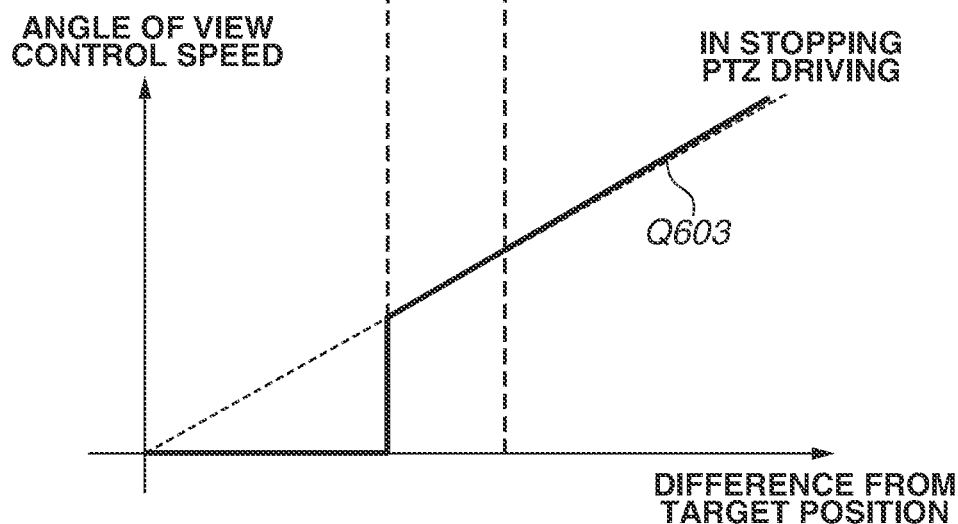

FIG.12
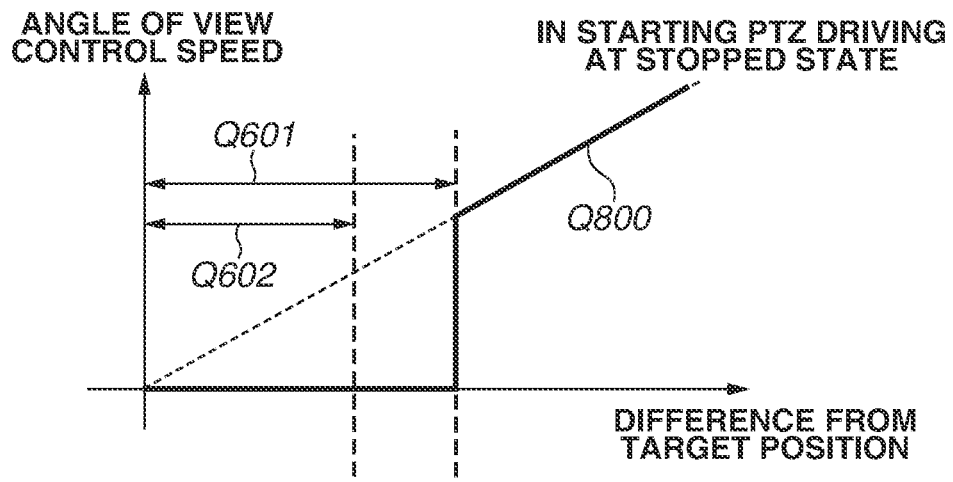
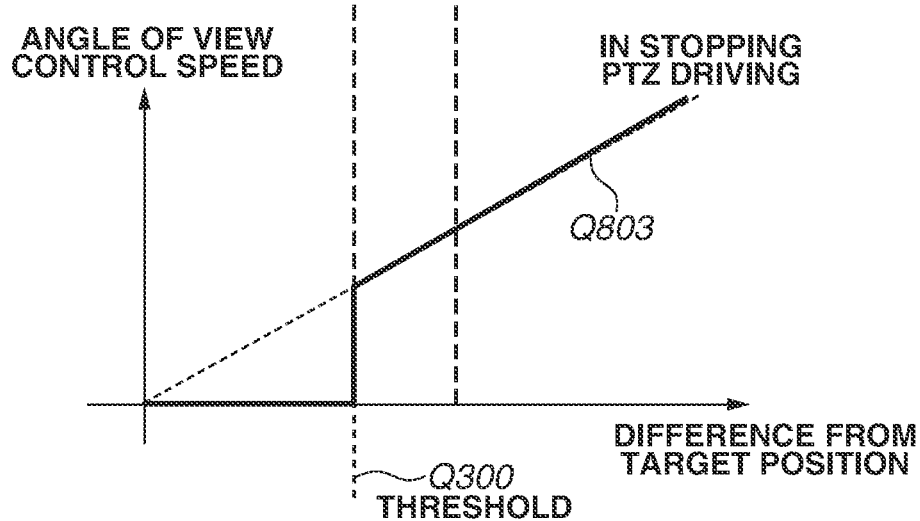
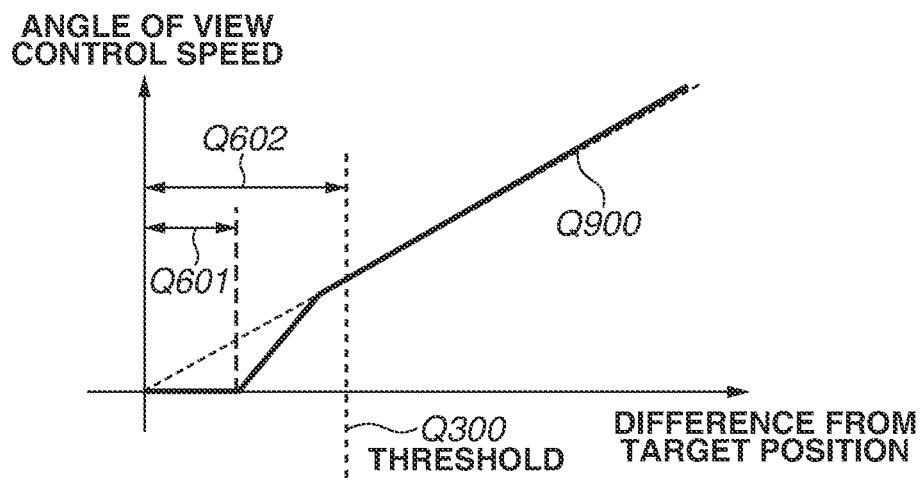

CONTROL APPARATUS, IMAGING SYSTEM, CONTROL METHOD, AND STORAGE MEDIUM

BACKGROUND OF THE INVENTION

Field of the Invention

The present invention relates to a control apparatus, an imaging system, a control method, a program, and a storage medium.

Description of the Related Art

As a technique for automatically tracking an object to be imaged and capturing an image of the object, a technique for adjusting the angle of view of an imaging apparatus by making pan, tilt, and zoom (hereinafter, referred to as PTZ) operations based on the movement of the tracking target to cover the tracking target within the angle of view has been known in recent years.

Japanese Patent Application Laid-Open Publication No. 2019-68183 discusses a monitoring apparatus for tracking an object entering a monitoring area and capturing an image of the object, the monitoring apparatus including an object detection unit configured to detect a position of the object, an imaging unit of which an imaging direction can be changed, and a mode switching unit. The monitoring apparatus discussed in Japanese Patent Application Laid-Open Publication No. 2019-68183 has at least two control modes depending on the moving speed of the object, and controls the imaging direction of the imaging unit based on either one of the control modes. Depending on the moving speed of the object determined from the detection result of the object detection unit, the mode switching unit switches from a low-speed control mode to a high-speed control mode and from the high-speed control mode to the low-speed control mode based on respective predetermined switching criteria.

SUMMARY OF THE INVENTION

According to an aspect of the present invention, a control apparatus configured to control an angle of view of an imaging apparatus includes at least one processor, and a memory coupled to the at least one processor, the memory storing instructions that, when executed by the at least one processor, cause the at least one processor to acquire an image captured by the imaging apparatus, detect an object from the image, and perform angle of view control on the imaging apparatus based on a difference between a position of the object in the image and a target position in the image. Whether to perform the angle of view control is determined based on the difference and at least one threshold for the difference. The angle of view control is performed by switching a plurality of control modes where control speed of the angle of view control is different based on any of a size of the object, the target position, and the at least one threshold.

Further features of the present invention will become apparent from the following description of embodiments with reference to the attached drawings.

BRIEF DESCRIPTION OF THE DRAWINGS

FIG. 4 is a diagram schematically illustrating other examples of the imaging settings according to the first embodiment.

FIG. 5 illustrates graphs for calculating an angle of view operation speed according to the first embodiment.

FIG. 6 is a diagram schematically illustrating switching of angle of view operation speed calculations based on a threshold according to the first embodiment.

FIG. 10 illustrates graphs for calculating an angle of view operation speed according to the second embodiment.

FIG. 12 is a diagram schematically illustrating switching of angle of view operation speed calculations based on a threshold according to the second embodiment.

DESCRIPTION OF THE EMBODIMENTS

Embodiments of the present invention will be described in detail below with reference to the attached drawings. The following embodiments are just examples of means for carrying out the present invention. Appropriate changes or modifications shall be made depending on configurations of the apparatuses to which the present invention is applied as well as various conditions, and the present invention is not limited to the following embodiments. Parts of the following embodiments may be combined as appropriate.

A configuration example of an automatic tracking imaging system according to a first embodiment will be described with reference to FIG. 1.

Figure 1:
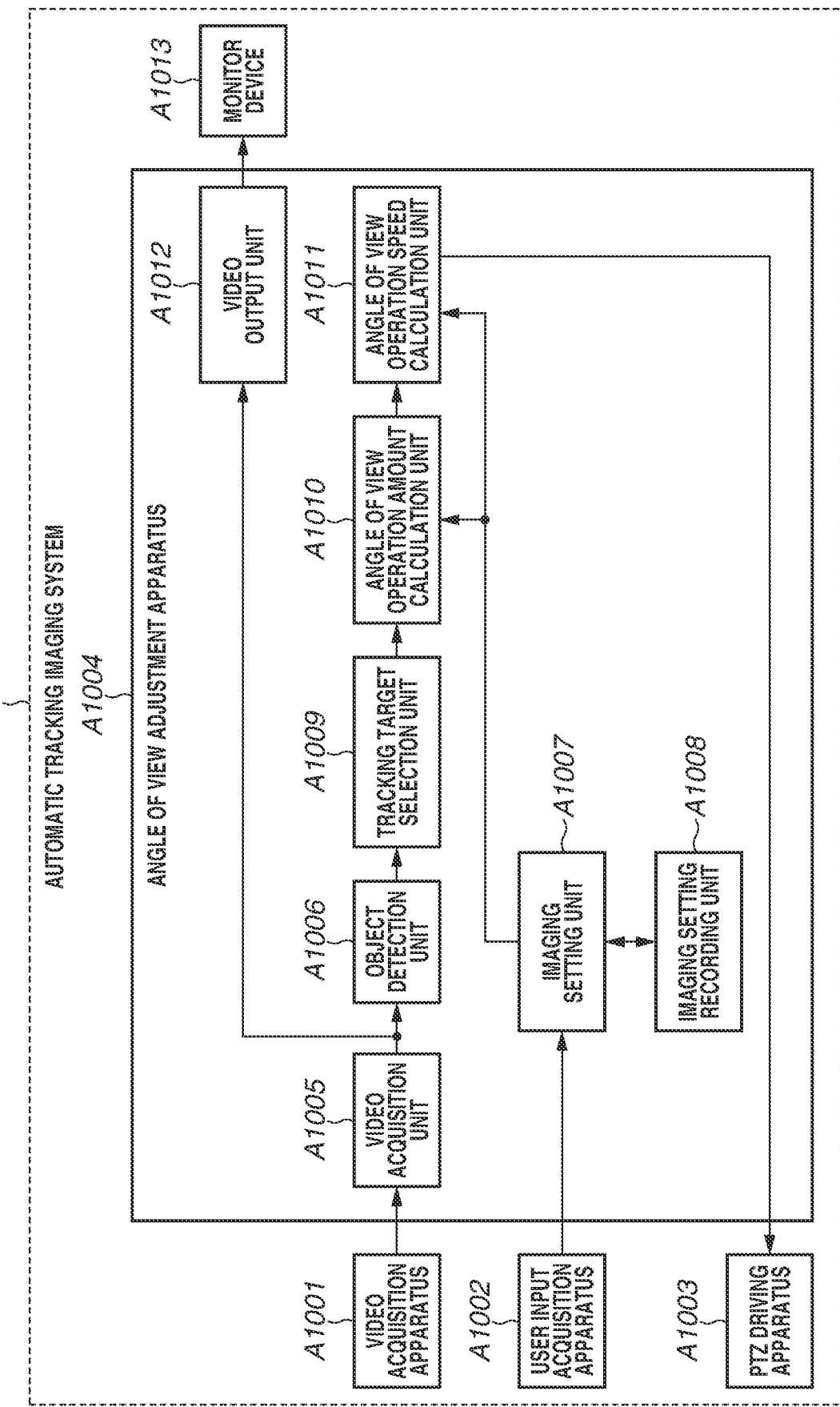
FIG. 1 is a block configuration diagram of an automatic tracking imaging system according to a first embodiment.

FIG. 1 is a block diagram illustrating a functional configuration of the automatic tracking imaging system.

An automatic tracking imaging system A1000 includes a video acquisition apparatus (imaging unit) A1001, a user input acquisition apparatus A1002, a pan-tilt-zoom (PTZ) driving apparatus A1003, an angle of view adjustment apparatus (control apparatus) A1004, and a monitor device A1013.

In the automatic tracking imaging system A1000, the angle of view adjustment apparatus A1004 performs automatic tracking processing based on a video image acquired from the video acquisition apparatus A1001 and automatic tracking imaging settings acquired from the user input acquisition apparatus A1002. In the automatic tracking processing, the PTZ driving apparatus A1003 is used to perform angle of view control so that a tracking target is kept within the angle of view. The imaging result can be displayed on the monitor device A1013.

The angle of view adjustment apparatus A1004 is connected to the video acquisition apparatus A1001, the user input acquisition apparatus A1002, and the PTZ driving apparatus A1003 via a network. The angle of view adjustment apparatus A1004 and the monitor device A1013 are connected via a video interface.

The video acquisition apparatus A1001 is an apparatus that captures an image of the surroundings and generates a video image (image). The video acquisition apparatus A1001 includes a camera.

The user input acquisition apparatus A1002 is an apparatus that acquires the automatic tracking imaging settings from the user. The user input acquisition apparatus A1002 includes a graphical user interface (GUI) to run on a web browser.

The PTZ driving apparatus A1003 is an apparatus that changes the angle of view of the video acquisition apparatus A1001. The PTZ driving apparatus A1003 includes driving units for performing PTZ control, such as a motor. The PTZ driving apparatus A1003 performs PTZ driving based on PTZ control values input from an angle of view operation speed calculation unit A1011. The PTZ driving apparatus A1003 may be integrated with the video acquisition apparatus A1001 or configured as a separate apparatus.

The angle of view adjustment apparatus A1004 performs tracking processing based on the coordinates of an object detected using the input video image, and an input composition setting. In other words, the angle of view adjustment apparatus A1004 is a control apparatus that controls the angle of view of the imaging unit (video acquisition apparatus) to track the object and capture an image of the object. The angle of view adjustment apparatus A1004 includes a video acquisition unit (image acquisition unit) A1005, an object detection unit (detection unit) A1006, an imaging setting unit (setting unit) A1007, and an imaging setting recording unit A1008. The angle of view adjustment apparatus A1004 also includes a tracking target selection unit (control unit) A1009, an angle of view operation amount calculation unit (control unit) A1010, the angle of view operation speed calculation unit (control unit) A1011, and a video output unit A1012.

The video acquisition unit A1005 is an image acquisition unit that acquires the image captured by the video acquisition apparatus A1001. The video acquisition unit A1005 outputs the acquired image to the object detection unit A1006 and the video output unit A1012. The video acquisition apparatus A1001 and the video acquisition unit A1005 can be communicably connected in a wired or wireless manner. Alternatively, the video acquisition unit A1005 may be configured to indirectly receive (acquire) the image via a non-illustrated network.

The object detection unit A1006 performs detection processing for detecting an object from the video information (image) input from the video acquisition unit A1005. Examples of the detection target include a human body, face, and head. The detection processing may use any method that can detect the detection target, including template matching and a technique using artificial intelligence (AI).

The imaging setting unit A1007 reflects settings related to automatic tracking imaging on various units when the settings are input from the user input acquisition apparatus A1002, and outputs the setting values to the imaging setting recording unit A1008. In the present embodiment, the automatic tracking imaging settings can include the size of a dead zone, a target size of the object in the image, and a target position of the object in the image. The dead zone defines a range of movement where the object can move without the PTZ control so that PTZ will not respond too sensitively to the movement of the object during the automatic tracking imaging. The angle of view is therefore not controlled as long as the object does not exceed the dead zone set on the image by the user. In other words, the size of the dead zone indicates the range of movement of the object where the angle of view is not controlled, and refers to the magnitude of a threshold for a difference between the detected position of the object and the target position of the object set on the image (position to capture the object at on the image). A description thereof will be given with reference to FIG. 2.

Figure 2:
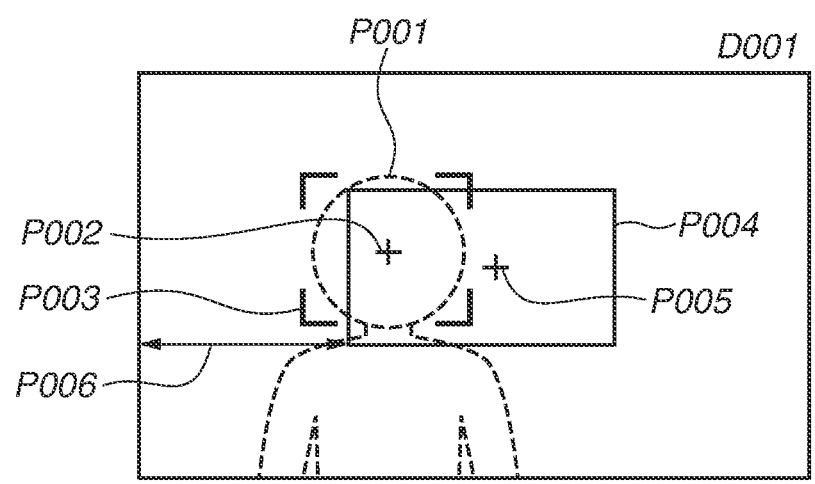
FIG. 2 is a diagram schematically illustrating imaging settings of the automatic tracking imaging system according to the first embodiment.

FIG. 2 is a diagram illustrating an image D001 during the automatic tracking imaging. FIG. 2 schematically illustrates an object P001, a center P002 of the object's face that is the tracking target, and a size P003 of the object's face that is the tracking object. For example, the size P003 of the object's face can be expressed by a detection frame of the object detected by the object detection unit A1006. FIG. 2 also illustrates a set dead zone P004 and a target position P005 to capture the object at. For example, in the case of automatic tracking imaging with the center P002 of the object's face as the tracking target, the angle of view is controlled so that if the object P001 moves and the center P002 of the face exceeds the dead zone P004, the center P002 of the face comes to the position of the center of the captured image. In other words, the dead zone P004 includes at least one threshold for a difference between the position of the object P001 (or the center P002 of the face) and the target position P005. That is, angle of view control is performed if the difference between the position of the object P001 and the target position P005 reaches or exceeds the threshold. Two or more thresholds may be provided for the difference in terms of a lateral length and a vertical length of the dead zone P004, or one or more thresholds may be provided for a linear distance from the target position P005. In the former case, the dead zone P004 can be rectangular (or trapezoidal or parallelogrammic) as in FIG. 2. In the latter case, the dead zone P004 can be circular (or elliptical). Moreover, the number and values of thresholds may or may not be dynamically changed depending on the shape and size of the set dead zone P004. For example, if the dead zone P004 is trapezoidal, the lateral or vertical thresholds corresponding to the legs can change linearly. If the dead zone P005 is rectangular, the number and values of thresholds can be constant. In the present embodiment, the dead zone P004 is rectangular, and thus vertical and horizontal thresholds are separately set on the image. Whether to perform the angle of view control is determined based on whether the difference between the position of the center P002 of the face and the target position P005 exceeds the threshold in at least either one of the two directions.

In the present embodiment, the dead zone P004 is described to include a threshold for the difference between the object P001 and the target position P005. However, whether to perform the angle of view control may be determined by determining whether the object P001 (or the center P002 of the face) falls within the dead zone P004 by using image analysis.

As described above, that the imaging setting unit A1007 sets the size of the dead zone is equivalent to setting the size of the dead zone (threshold(s)) P004 in FIG. 2. Setting the target size to capture an image of the object in is equivalent to setting how much of the image the size P003 of the object's face occupies. Setting the target position to capture the object P001 at is equivalent to setting the target position P005.

Any given position that does not exceed an object range corresponding to the detected object can be used as the position of the object P001. For example, the center position of the object's face (or head) described in the present embodiment can be the object's position. The barycentric position of the object or an end of the object's face can be used as the object's position. If the object to be detected is an automobile, the center position of the license plate or the windshield can be used as the object's position. The object's position shall be settable as appropriate depending on the detection target. Like the present embodiment, for example, a dead zone can be set to make adjustments such that the PTZ control is not performed as long as the object changes its position only a little, and the PTZ control is started after the object starts to make some movement.

The imaging setting recording unit A1008 records the automatic tracking imaging settings input from the imaging setting unit A1007. More specifically, the imaging setting recording unit A1008 records the size of the dead zone (at least one threshold), the target size of the object, and/or the target position.

The tracking target selection unit A1009 selects the target to perform the automatic tracking processing on if a plurality of pieces of face information is input from the object detection unit A1006. The tracking target may be selected by any method. For example, the user may select a face to be tracked in starting automatic tracking. After the start of the automatic tracking, an object closest to the position of the coordinates of the face input from the object detection unit A1006 in the previous frame can be selected as the tracking target in the current frame. Alternatively, an object detected at a position closest to the position predicted from a history of movement of the tracking target may be selected as the tracking target.

The angle of view operation amount calculation unit A1010 calculates the amounts of PTZ movement to achieve the position and size specified by the imaging setting unit A1007, based on the current position and size of the tracking target in the image.

The angle of view operation speed calculation unit A1011 calculates PTZ moving speed values from the amounts of PTZ movement input from the angle of view operation amount calculation unit A1010. Here, the angle of view operation speed calculation unit A1011 determines whether steep PTZ control is desirable based on the automatic tracking imaging settings specified by the imaging setting unit A1007, and calculates the PTZ moving speed values based on the determination result. Details of the determination and calculation will be described below with reference to FIGS. 4 and 5.

The video output unit A1012 outputs the video image input from the video acquisition unit A1005 to the monitor device A1013.

The monitor device A1013 displays the video image input from the video output unit A1012 on its monitor.

Figure 3:
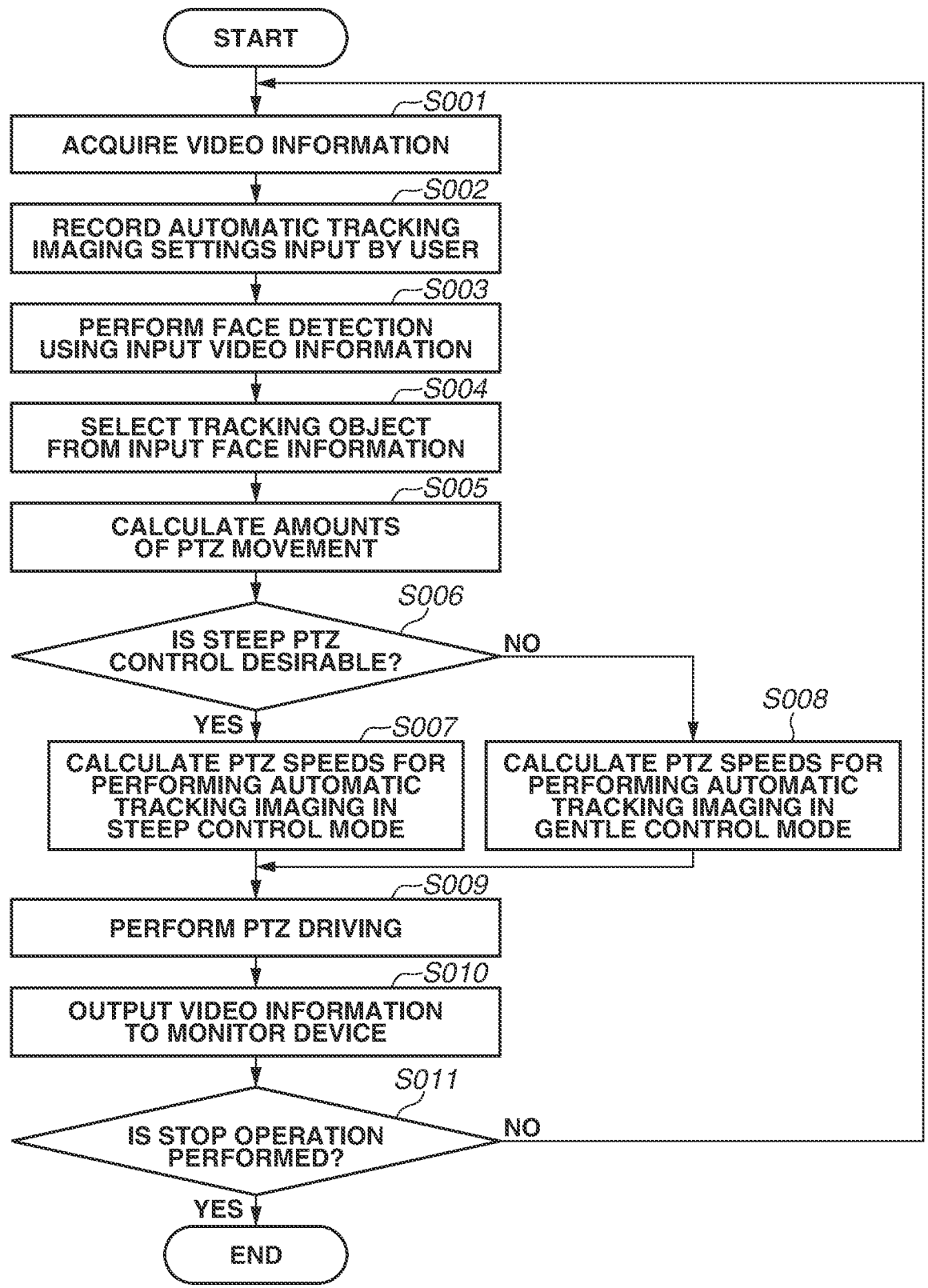
FIG. 3 is a flowchart illustrating a processing procedure of the automatic tracking imaging system according to the first embodiment.

Next, a processing procedure of the automatic tracking imaging system A1000 will be described with reference to the flowchart of FIG. 3.

When the automatic tracking imaging system A1000 is activated by a user operation, then in step S001, the video acquisition unit A1005 initially acquires video information from the video acquisition apparatus A1001 and outputs the video information to the object detection unit A1006 and the video output unit A1012.

In step S002, the angle of view adjustment apparatus A1004 accepts the automatic tracking imaging settings from the user via the user input acquisition apparatus A1002, and outputs the automatic tracking imaging settings to the imaging setting unit A1007. The imaging setting unit A1007 outputs the input automatic tracking imaging settings to the imaging setting recording unit A1008 for recording.

In step S003, the object detection unit A1006 performs face detection using the input video information, and outputs detected face information and the video information to the tracking target selection unit A1009.

In step S004, the tracking target selection unit A1009 selects a tracking target from the input face information, and outputs coordinate information about the tracking target to the angle of view operation speed calculation unit A1011 as a selection result.

In step S005, the angle of view operation amount calculation unit A1010 calculates the amounts of PTZ movement to achieve the position and size specified by the automatic tracking imaging settings.

In step S006, the angle of view operation speed calculation unit A1011 determines whether steep PTZ control (first control mode) is desirable for the automatic tracking imaging settings made by the user. Examples of the automatic tracking imaging settings where steep PTZ control is desirable will initially be described with reference to FIG. 4.

FIG. 4 is a diagram illustrating video images captured during the automatic tracking imaging like FIG. 2. In images D101, D102, and D103, elements similar to those of FIG. 2 are denoted by the same reference numerals (P001 to P005).

The image D101 in FIG. 4 is a video image captured in a case where the object size is set to be larger than with the image D001 in FIG. 2. In the image D101, the object P001 and the size P003 of the object's face are thus larger than in the image D001. If the image D101 is captured in such a size and the object P001 moves at the same speed, the object P001 goes out of the imaging screen earlier than with the image D001. In other words, steeper PTZ control is more desirable in capturing the image D101 than the image D001.

The image D102 in FIG. 4 is a video image captured in a case where the dead zone P004 is set to be larger than with the image D001 in FIG. 2. In the image D102, the PTZ control is thus started after the object P001 comes closer to an end of the imaging screen than in the image D001. In other words, in the case of capturing an image with such a dead zone setting as in the image D102, there is less margin before the object P001 goes out of the imaging screen than in the image D001. Steep PTZ control is thus more desirable in the case of capturing the image D102 than the image D001.

The image D103 in FIG. 4 is a video image captured in a case where the target position P005 to capture the object P001 at is set to be closer to a screen end than with the image D001 in FIG. 2. In the case of the image D103, there is less margin before the object P001 goes out of the imaging screen when the object P001 moves to the left onscreen than with the image D001. Steep PTZ control is thus also desirable in such a case.

In the present embodiment, the angle of view operation speed calculation unit A1011 then determines whether steep PTZ control is desirable for the automatic tracking imaging settings, based on the size of the object, the size of the dead zone, and/or the target position to capture the object at.

Specific determination processing may be implemented in any given manner. As an example, a method for calculating a distance from the point where the PTZ control is started to a point where the object goes out of the imaging screen and making the determination based on the distance will be described. This distance corresponds to the distance represented by an arrow P006 in FIGS. 2 and 4. For the sake of simplicity, only a horizontal distance of movement of the object will be described. A vertical distance can also be calculated by a similar method.

The angle of view operation speed calculation unit A1011 initially acquires the length of the portion indicated by the arrow P006 in the captured image. The length can be acquired based on how many pixels the left end of the dead zone P004 is located at from the left end of the image. The angle of view operation speed calculation unit A1011 then similarly acquires the horizontal length of the face in the captured image. The horizontal length can be acquired by calculating how many pixels each of the left and right ends of the face is located at from the left end of the image, and calculating the difference therebetween.

The angle of view operation speed calculation unit A1011 finally determines whether steep PTZ control is desirable based on the length of the arrow P006 with respect to the horizontal length of the face. The determination threshold may be freely set. For example, steep PTZ control may be determined to be desirable if the length of the arrow P006 is smaller than the horizontal length of the face. If not, steep PTZ control is determined not to be needed. If steep PTZ control is not needed, the angle of view operation speed calculation unit A1011 determines that gentle PTZ control (second control mode) can be performed.

In another example of the method for determining the determination threshold, consideration is given to the moving speed of the object assumed in the automatic tracking imaging and a processing delay time until the automatic tracking imaging system A1000 can start control of the PTZ position. For example, a distance at which PTZ control can be gently started without the object being lost may be calculated and used as the threshold in consideration of the foregoing.

Instead of taking into consideration all the settings including the size of the object, the size of the dead zone, and the target position to capture the object at, the threshold may be determined in consideration of only the size of the dead zone, for example.

If the determination of step S006 is true (YES in step S006), the processing proceeds to step S007. If the determination is false (NO in step S006), the processing proceeds to step S008.

In step S007, the angle of view operation speed calculation unit A1011 calculates PTZ speeds for performing the automatic tracking imaging in a steep control mode (first control mode). FIG. 5 illustrates an example of a P speed (pan driving control speed) calculated by the angle of view operation speed calculation unit A1011.

A graph G100 in FIG. 5 illustrates an example of the P speed for performing the automatic tracking imaging in the steep control mode. The horizontal axis indicates the absolute value of a horizontal difference between the center P002 of the face and the target position P005 to capture the object at. The vertical axis indicates the P speed that the angle of view operation speed calculation unit A1011 outputs based on the difference. While only the calculation of the P speed will be described for the sake of simplicity, the same applies to a T speed (tilt driving control speed) and a Z speed (zoom driving control speed). In the case of the T speed, the horizontal axis indicates the absolute value of a vertical difference between the center P002 of the face and the target position P005 to capture the object at. The vertical axis indicates the T speed. In the case of the Z speed, the horizontal axis indicates a difference between the size of the captured face and the target size of the face. The vertical axis indicates the Z speed.

In the steep control mode, the angle of view operation speed calculation unit A1011 outputs an angle of view operation speed Q100 as illustrated in the graph G100 based on the difference. A section Q101 illustrated in FIG. 5 represents the dead zone. If the difference falls within the dead zone Q101, the angle of view is not controlled, and the angle of view operation speed Q100 is zero. On the other hand, if the difference exceeds the dead zone Q101, the angle of view operation speed calculation unit A1011 outputs an angle of view operation speed proportional to the difference. The video acquisition apparatus A1001 can thus be panned at a predetermined speed immediately after the dead zone Q101 is exceeded. A similar method can also be applied to the vertical direction, whereby the video acquisition apparatus A1001 can be tilted at a predetermined speed immediately after the dead zone is exceeded.

In step S008, the angle of view operation speed calculation unit A1011 calculates PTZ speeds for performing the automatic tracking imaging in a gentle control mode (second control mode). A graph G200 in FIG. 5 illustrates an example of the P speed for performing the automatic tracking imaging in the gentle control mode.

The angle of view operation speed calculation unit A1011 outputs an angle of view operation speed Q200 as illustrated in the graph G200 based on the difference. Like step S007, if the difference falls within the dead zone Q101, the angle of view is not controlled, and the angle of view operation speed Q200 in this section is zero. In contrast, if the difference exceeds the dead zone Q101, the angle of view operation speed calculation unit A1011 increases the angle of view control speed stepwise depending on the increase in the difference, and eventually outputs the angle of view operation speed proportional to the difference like the graph G100. Since the angle of view operation speed Q200, or P speed, immediately after the object exceeds the dead zone Q101 is substantially zero, the angle of view operation speed calculation unit A1011 calculates the P speed to increase stepwise from immediately before to immediately after the object exceeds the dead zone Q101. The PTZ driving apparatus A1003 can thus implement gentle control. As a result, the angle of view can be smoothly controlled after the object exceeds the dead zone.

FIG. 6 illustrates an example of determining whether steep PTZ control is desirable based on the magnitude of a dead zone setting value. In this example, the P speed is controlled by switching to the steep control mode if the dead zone is greater than or equal to a predetermined threshold, and to the gentle control mode if the dead zone is smaller than the predetermined threshold.

The horizontal and vertical axes of graphs G300 and G400 illustrated in FIG. 6 are the same as those in FIG. 5. FIG. 6 also illustrates a threshold Q300 for the size of the dead zone to be used in switching whether to use the steep control mode or use the gentle control mode. As illustrated in FIG. 6, if the set size of the dead zone is smaller than the threshold Q300, the angle of view operation speed calculation unit A1011 calculates the P speed using the graph G400 to implement gentle PTZ control. In contrast, if the set size of the dead zone is greater than or equal to the threshold Q300, the angle of view operation speed calculation unit A1011 calculates the P speed using the graph G300 to implement steep PTZ control.

The P speed output in the gentle control mode is not limited to those illustrated in FIGS. 5 and 6. As another example, like a graph G500 illustrated in FIG. 7, the angle of view operation speed calculation unit A1011 and the PTZ driving apparatus A1003 may control increase of the P speed in a curved manner in the section before the P speed proportional to the difference is output.

Figure 7:
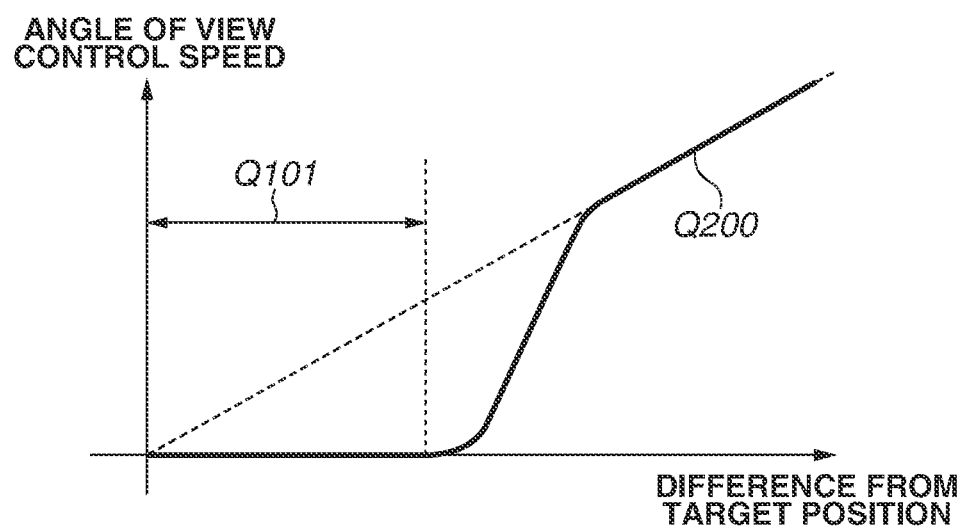
FIG. 7 is a graph for calculating the angle of view operation speed according to the first embodiment.

Referring to FIGS. 5, 6, and 7, examples of eventually outputting the angle of view operation speed proportional to the difference have been described. However, the difference and the speed are not limited to the proportional relationship, and may have a nonlinear relationship.

In step S009, the angle of view operation speed calculation unit A1011 outputs the calculated angle of view operation speeds to the PTZ driving apparatus A1003. The PTZ driving apparatus A1003 changes the imaging angle of view by performing PTZ driving at the specified speeds.

In step S010, the video output unit A1012 outputs the input video information to the monitor device A1013.

In step S011, the angle of view operation speed calculation unit A1011 determines whether a not-illustrated automatic tracking imaging system ON/OFF switch is operated by a user operation and a stop operation of the automatic tracking imaging processing is performed. If the determination is false (NO in step S011), the processing proceeds to step S001. If the determination is true (YES in step S011), the automatic tracking imaging processing ends.

In the present embodiment, the angle of view operation speeds are described to be automatically switched to appropriate ones based on the automatic tracking imaging settings. However, the automatic tracking imaging system A1000 may detect the processing delay time until the control of the PTZ position can be started, and control switching to the steep PTZ speed mode (steep control mode) if the processing delay time is longer than a predetermined threshold. The reason is that if the processing delay time is long, the object is more likely to be lost and the steep control can provide the effect of preventing a lost object.

Similar determinations may be made using other lost object-related parameters. For example, the moving speed of the object may be measured, and the switching to the steep PTZ speed mode may be controlled if the object speed is higher than a threshold.

In the present embodiment, the appropriate angle of view operation speeds are described to be automatically set based on the size setting of the object. However, such an externally set value does not need to be used. For example, the size of the object in the actually automatically tracked and captured video image may be detected, and the angle of view operation speeds may be switched based on the object size.

Moreover, if lost object-related parameters, such as the object size and the processing delay time of the automatic tracking imaging system A1000, are detected and the angle of view operation speeds are switched based on the detection results, the switching processing may be automatically dynamically performed during the automatic tracking imaging. This eliminates the need for the user to change the automatic tracking imaging settings each time the imaging condition changes, and can further improve the user convenience.

All or some of the video acquisition apparatus A1001, the user input acquisition apparatus A1002, the PTZ driving apparatus A1003, the angle of view adjustment apparatus A1004, and the monitor device A1013 constituting the automatic tracking imaging system A1000 may be integrated into a single apparatus.

As described above, according to the present embodiment, whether the automatic tracking imaging is being performed under automatic tracking imaging conditions where the object can be easily lost is determined, and the tracking speed to track the object at can be automatically determined based on the determination result. As a result, the user can facilitate making the automatic tracking imaging settings for achieving as smooth object tracking as possible while reducing the risk of the object being lost, and appropriately switch the control mode of the video acquisition apparatus.

A configuration example of an automatic tracking imaging system according to a second embodiment will be described with reference to FIG. 8. In the present embodiment, a configuration and processing for improving the smoothness of the steep PTZ operation according to the first embodiment will be described.

Specifically, if the steep PTZ operation described in the first embodiment is performed, high-speed PTZ driving can be performed immediately after the object exits the dead zone. However, depending on the imaging condition, the object can move out of the dead zone and immediately back into the dead zone again. This results in an operation of starting to move the angle of view and immediately stopping the angle of view again. The present embodiment includes additional processing for reducing such an operation.

Figure 8:
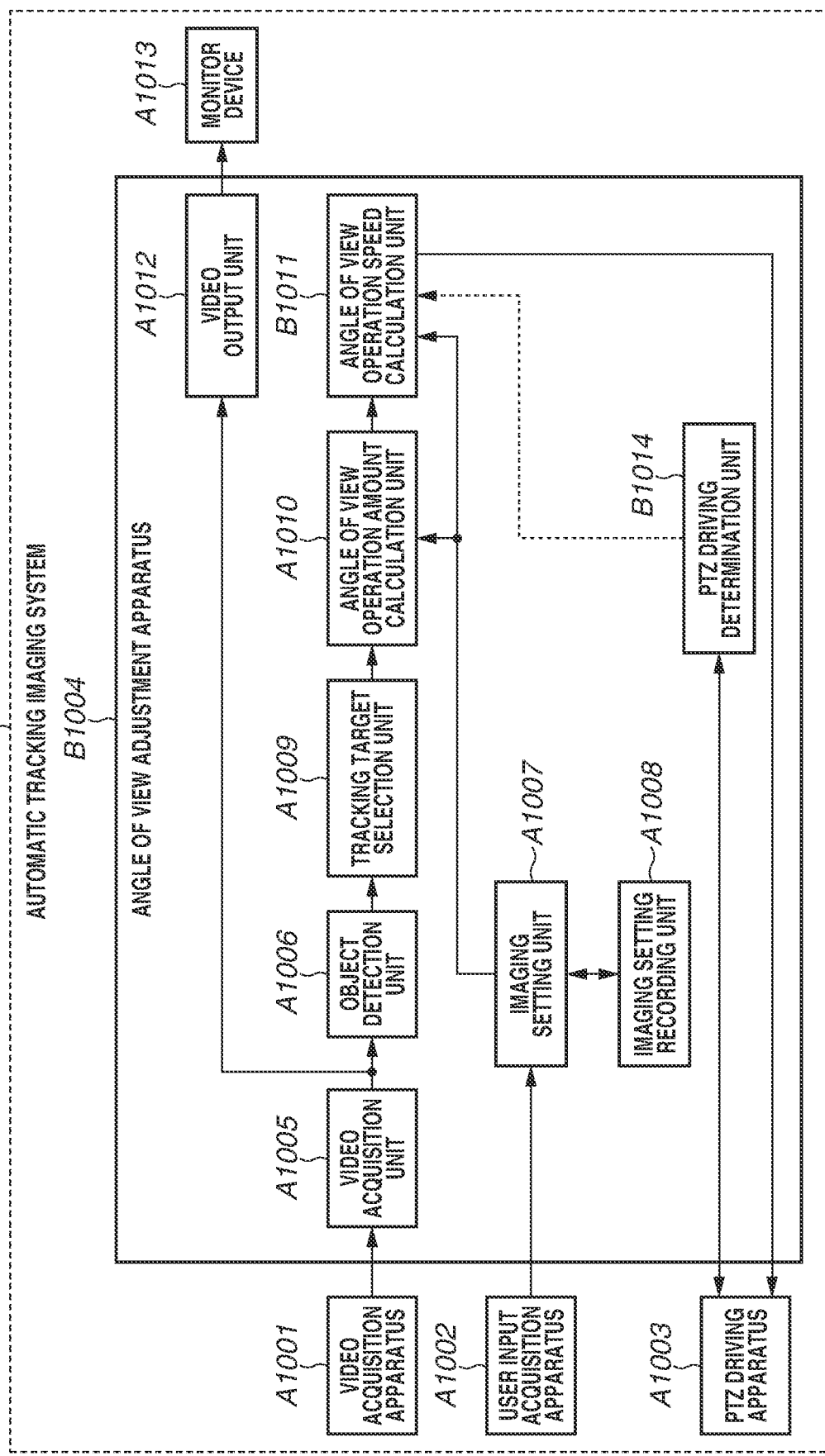
FIG. 8 is a block configuration diagram of an automatic tracking imaging system according to a second embodiment.

FIG. 8 is a block diagram illustrating a functional configuration of an automatic tracking imaging system B1000 according to the present embodiment. Blocks similar to those of the automatic tracking imaging system A1000 illustrated in FIG. 1 are denoted by the same reference numerals as in FIG. 1. Differences from the automatic tracking imaging system A1000 lie in an angle of view operation speed calculation unit B1011 and a PTZ driving determination unit B1014. A description of processing units similar to those of the automatic tracking imaging system A1000 will be omitted.

The angle of view operation speed calculation unit B1011 calculates PTZ moving speed values from the amounts of PTZ movement input from the angle of view operation amount calculation unit A1010. The angle of view operation speed calculation unit B1011 also determines whether steep PTZ control is desirable based on the automatic tracking imaging settings specified by the imaging setting unit A1007, and calculates the PTZ moving speed values based on the determination. Unlike the angle of view operation speed calculation unit A1011, the angle of view operation speed calculation unit B1011, when performing steep PTZ operation, switches the size of the dead zone to be used in calculating the speed values depending on whether the PTZ driving apparatus is in a driving state. Specifically, two types of dead zones including one to be used during PTZ driving (hereinafter, referred to as an operational dead zone) and one to be used while the PTZ driving apparatus A1003 is at rest (hereinafter, referred to as a stationary dead zone) are switched in use. Details of the calculation will be described below with reference to FIG. 10. The stationary dead zone includes a threshold (first threshold) for determining whether to perform angle of view control. The operational dead zone includes a threshold (second threshold) for determining whether to quit the angle of view control. Similarly to the threshold described in the first embodiment, the first and second thresholds are thresholds for a difference between the position of the object and the target position.

The PTZ driving determination unit B1014 acquires a state about whether the PTZ driving apparatus A1003 is performing PTZ driving or at rest.

Figure 9:
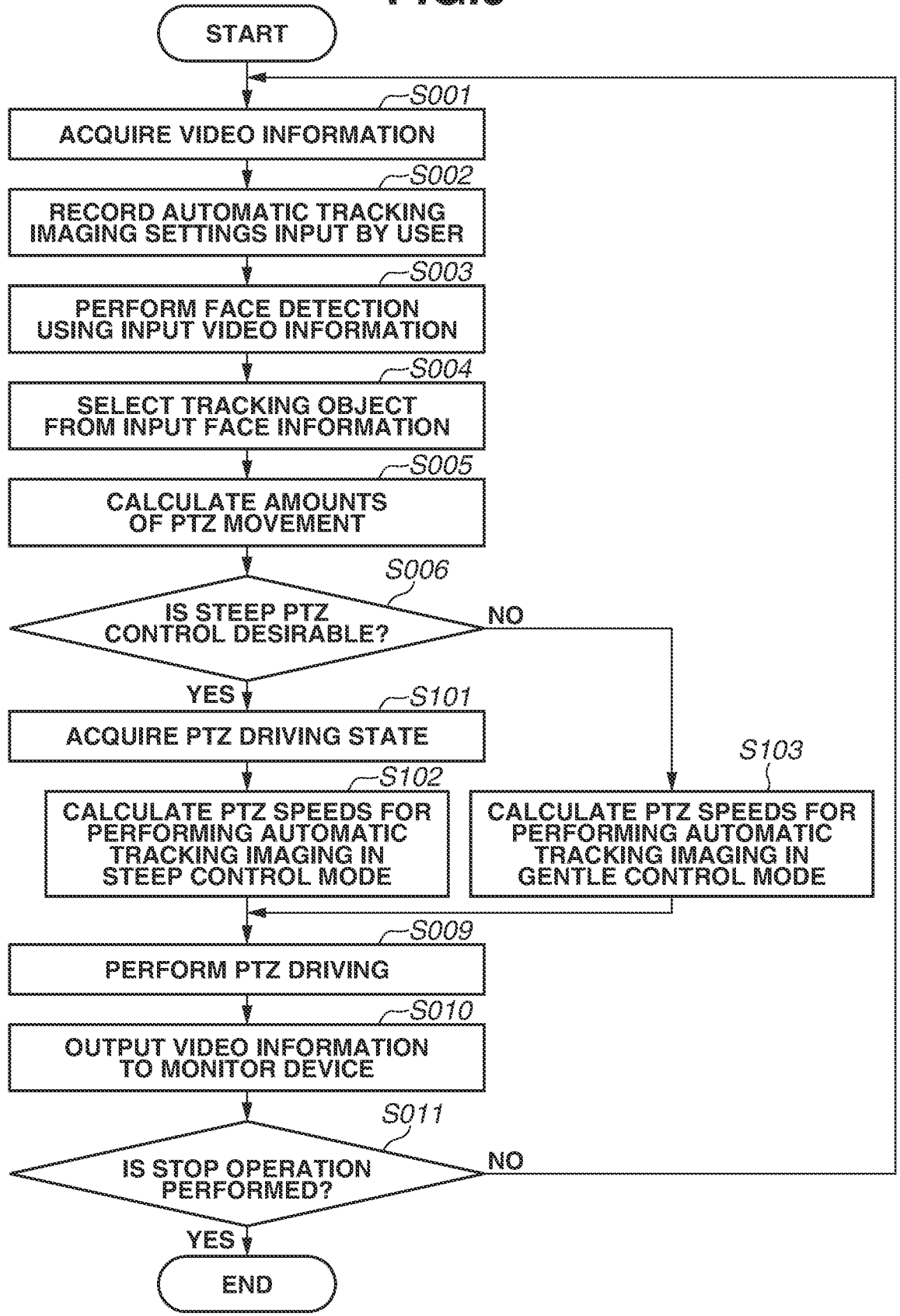
FIG. 9 is a flowchart illustrating a processing procedure of the automatic tracking imaging system according to the second embodiment.

Next, a processing procedure of the automatic tracking imaging system B1000 will be described with reference to the flowchart of FIG. 9. Processing similar to that of the processing procedure of the automatic tracking imaging system A1000 illustrated in FIG. 2 will be denoted by the same step numbers as in FIG. 2. Differences from the processing procedure of the automatic tracking imaging system A1000 lie in the processing of steps S101, S102, and S103. A description of the processing procedure similar to that of the automatic tracking imaging system A1000 will be omitted.

In step S101, the PTZ driving determination unit B1014 acquires a state (PTZ driving state) about whether the PTZ driving apparatus A1003 is performing PTZ driving or at rest.

The PTZ driving state may be acquired in any given manner. For example, the PTZ driving determination unit B1014 acquires the PTZ driving state by communicating with the PTZ driving apparatus A1003 via the network and acquiring the status thereof.

The PTZ driving determination unit B1014 outputs the acquisition result to the angle of view operation speed calculation unit B1011.

In step S102, the angle of view operation speed calculation unit B1011 calculates PTZ speeds for performing automatic tracking imaging in the steep control mode. FIG. 10 illustrates examples of the PTZ speeds calculated by the angle of view operation speed calculation unit B1011.

Graphs G600 and G601 in FIG. 10 illustrate examples of the P speed for performing the automatic tracking imaging in the steep control mode. For convenience of description, the P speed in the case of starting PTZ driving at a stopped state will be described with reference to the graph G600. The P speed in the case of stopping the PTZ driving will be described with reference to the graph G601. The horizontal axes indicate the absolute value of the difference between the center P002 of the face and the target position P005 to capture the object at in FIG. 2. The vertical axes indicate the P speed output based on the difference. FIG. 10 also illustrates a stationary dead zone Q601 and an operational dead zone Q602.

The operation up to a start of the PTZ driving will initially be described. The angle of view operation speed calculation unit B1011 does not control the angle of view as long as the difference falls within the stationary dead zone Q601.

In this section, an angle of view operation speed Q600 is therefore zero. After the difference exceeds the stationary dead zone Q601, the angle of view operation speed calculation unit B1011 outputs an angle of view operation speed proportional to the difference. As a result, the P operation (pan driving) can be performed at a predetermined speed immediately after the stationary dead zone Q601 is exceeded.

Next, the operation after the start of the PTZ driving will be described with reference to the graph G601. During the PTZ driving, the angle of view operation speed calculation unit B1011 outputs an angle of view operation speed proportional to the difference even if the difference falls into the stationary dead zone Q601, and outputs zero when the difference falls into the operational dead zone Q602. In other words, in the section where the difference falls within the operational dead zone Q602, an angle of view control speed Q603 is zero. As a result, the PTZ driving is continued when the difference falls into the stationary dead zone Q601, and stopped when the difference falls into the operational dead zone Q602.

As a result of such processing by the angle of view operation speed calculation unit B1011, the PTZ driving started is not stopped until the difference becomes somewhat smaller than that at the start of driving. In other words, an operation can be reduced such that the PTZ driving is started and immediately stopped again because the object returns to the dead zone immediately after the start of the PTZ driving.

In contrast, if the steep PTZ operation is not needed (NO in step S006), the processing proceeds to step S103. In step S103, the angle of view operation speed calculation unit B1011 calculates the PTZ speeds for performing the automatic tracking imaging in the gentle control mode.

Figure 11:
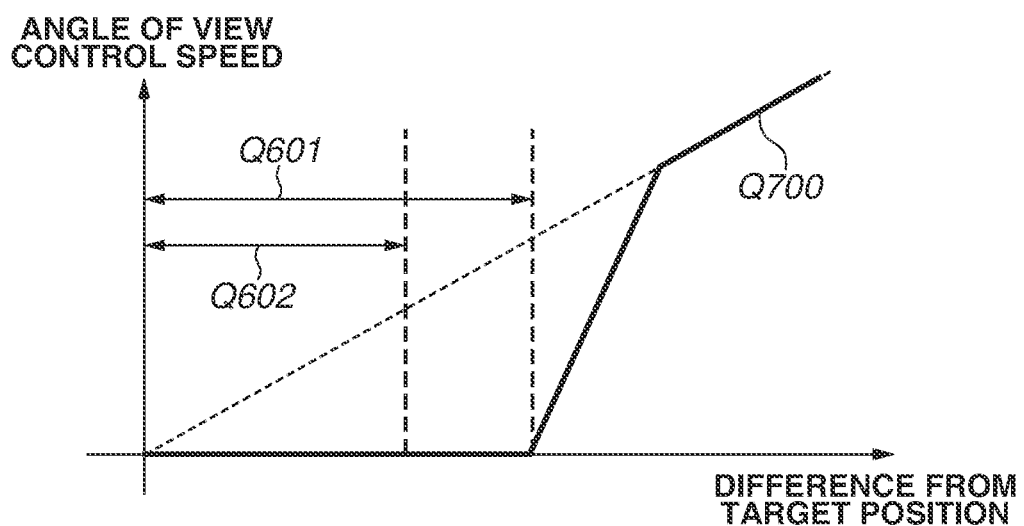
FIG. 11 illustrates a graph for calculating an angle of view operation speed according to the second embodiment.

A graph G700 in FIG. 11 illustrates an example of the P speed for performing the automatic tracking imaging in the gentle control mode. The horizontal axis indicates the absolute value of the difference between the center P002 of the face and the target position P005 to capture the object at. The vertical axis indicates the P speed output based on the difference. FIG. 11 also illustrates a stationary dead zone Q601 and an operational dead zone Q602. In the gentle control mode, the angle of view operation speed calculation unit B1011 calculates the PTZ speeds using either one of the stationary and operational dead zones Q601 and Q602. The graph G700 illustrates an example of calculating the P speed using the stationary dead zone Q601.

As illustrated in the graph G700, the angle of view operation speed calculation unit B1011 gradually increases the angle of view control speed (P speed) stepwise based on the increase in the difference after the difference exceeds the stationary dead zone Q601. A difference from the first embodiment is that either one of the stationary and operational dead zones is used.

The thresholds of the stationary and operational dead zones illustrated in FIGS. 10 and 11 may be freely determined. If the steep PTZ speeds are calculated using both the stationary and operational dead zones, the threshold of the stationary dead zone is desirably the same as or greater than that of the operational dead zone as illustrated in FIG. 10. The reason is that if the relationship is reversed, the operational dead zone having a threshold greater than that of the stationary dead zone is consulted immediately after the difference exceeds the stationary dead zone and the PTZ driving is started. This results in an operation such that the PTZ driving is stopped immediately after started.

To prevent the user from setting the dead zones having the foregoing relationship in value, the user can be allowed to set only the stationary dead zone, for example. The automatic tracking imaging system B1000 can then automatically internally determine a threshold smaller than that of the user-set stationary dead zone as that of the operational dead zone. In such a case, the operational dead zone is desirably set to not be smaller than the threshold for switching the PTZ operations. In other words, the second threshold is desirably less than the first threshold.

If both the stationary and operational dead zones are settable by the user, the angle of view operation speed calculation unit B1011 can determine the presence of the unexpected relationship in value. The angle of view operation speed calculation unit B1011 can then calculate the PTZ speeds by calculation similar to that in the first embodiment, using only the stationary dead zone or the operational dead zone.

Alternatively, the threshold of the operational dead zone may be set to the same as the threshold for switching the steep and gentle PTZ operations, so that the steep operation mode is not usable with the reversed relationship in value by principle.

FIG. 12 illustrates examples of speed calculation in such a case. In FIG. 12, the horizontal axes indicate the absolute value of the difference between the center P002 of the face and the target position P005 to capture the object at in FIG. 2. The vertical axes indicate the P speed output based on the difference. FIG. 12 also illustrates a stationary dead zone Q601 and an operational dead zone Q602. A threshold Q300 for switching whether to use the steep control mode or the gentle control mode has the same value as that of the operational dead zone Q602.

In FIG. 12, if the stationary dead zone Q601 is set to a value greater than or equal to the threshold Q300, the angle of view operation speed calculation unit B1011 calculates the P speed in the steep control mode. In starting the PTZ driving at a stopped state, the angle of view operation speed calculation unit B1011 thus calculates the P speed like an angle of view control speed G800. In stopping the PTZ driving, the angle of view operation speed calculation unit B1011 calculates the P speed like an angle of view control speed G801.

In contrast, if the stationary dead zone Q601 is set to a value less than the threshold Q300, the angle of view operation speed calculation unit B1011 calculates the P speed in the gentle control mode. The angle of view operation speed calculation unit B1011 thus calculates the P speed like an angle of view control speed G900.

In other words, a case is precluded where the stationary dead zone Q601 is set to a value smaller than the size of the operational dead zone Q602 and the angle of view operation speed calculation unit B1011 calculates the PTZ speeds in the steep operation mode. As a result, if the steep control mode is used, the relationship that the stationary dead zone Q601 has a threshold greater than or equal to the size of the operational dead zone Q602 can always be automatically satisfied.

All or some of the video acquisition apparatus A1001, the user input acquisition apparatus A1002, the PTZ driving apparatus A1003, the angle of view adjustment apparatus B1004, and the monitor device A1013 constituting the automatic tracking imaging system B1000 according to the present embodiment may be integrated into a single apparatus.

(Hardware Configuration)

Figure 13:
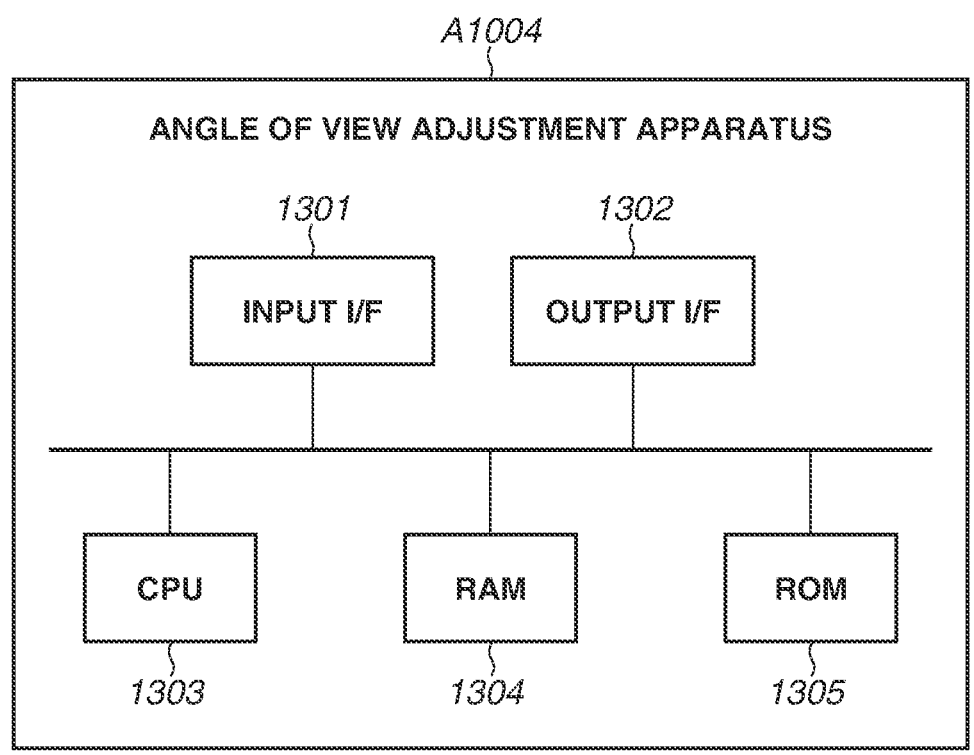
FIG. 13 is a diagram illustrating a hardware configuration example of an angle of view adjustment apparatus according to the first or second embodiment.

FIG. 13 is a diagram illustrating a hardware configuration example of the angle of view adjustment apparatus A1004 according to the first embodiment. The angle of view adjustment apparatus B1004 according to the second embodiment has a similar hardware configuration. The angle of view adjustment apparatus A1004 includes an input interface (I/F) 1301, an output I/F 1302, a central processing unit (CPU) 1303, a random access memory (RAM) 1304, and a read-only memory (ROM) 1305.

The input I/F 1301 is an I/F for accepting information (images and user commands) from the apparatuses connected to the angle of view adjustment apparatus A1004, such as the video acquisition apparatus A1001 and the user input acquisition apparatus A1002.

The output I/F 1302 is an I/F for outputting an image to an external apparatus such as the monitor device A1013, and outputting PTZ control information to the PTZ driving apparatus A1003.

The CPU 1303 is one for controlling the angle of view adjustment apparatus A1004 in a centralized manner. The RAM 1304 is a volatile memory. The RAM 1304 is used as a workspace for executing programs, and temporarily stores information about the target size of the object, the target position, and the dead zone set by the user, for example. The ROM 1305 is a nonvolatile storage medium and stores programs for the CPU 1303 to execute.

Some of the functional blocks of the angle of view adjustment apparatus A1004 are implemented by software. Programs for providing the functions of such functional blocks are stored in a memory such as the ROM 1305. The functional blocks are implemented by the CPU 1303 reading the programs into the RAM 1304 and executing the programs. In each of the flowcharts described in the first and second embodiments, operations to be implemented by software, such as the angle of view control by the angle of view adjustment apparatus, are implemented by the CPU 1303 executing the programs stored in the ROM 1304 as described above.

As described above, according to the present embodiment, the likelihood of an operation such that the angle of view starts to move and immediately stops again because the object moves out of the dead zone and immediately back into the dead zone again during the steep PTZ operation can be reduced in addition to the effects of the first embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-179917, filed Nov. 9, 2022, which is hereby incorporated by reference herein in its entirety.

What is claimed is:

1. A control apparatus configured to control an angle of view of an imaging apparatus, the control apparatus comprising:
   one or more processors; and
   one or more memories coupled to the one or more processors, the one or more memories storing instructions that, when executed by the one or more processors, cause the one or more processors to
   acquire an image captured by the imaging apparatus,
   detect an object from the image, and perform angle of view control on the imaging apparatus based on a difference between a position of the object in the image and a target position in the image,
wherein whether to perform the angle of view control is determined based on the difference and at least one threshold for the difference,
wherein the angle of view control is performed by switching a plurality of control modes where control speed of the angle of view control is different based on any of a size of the object, the target position, and the at least one threshold, and
wherein the plurality of control modes includes a first control mode where the angle of view control is performed based on the difference at a first angle of view control speed and a second control mode where the angle of view control is performed based on the difference at a second angle of view control speed lower than the first angle of view control speed.

2. The control apparatus according to claim 1, wherein the angle of view control on the imaging apparatus is performed if the difference is greater than the at least one threshold.

3. The control apparatus according to claim 1,
wherein if the angle of view control is performed based on the at least one threshold and the at least one threshold is greater than or equal to a predetermined value, the angle of view control is performed in the first control mode, and
wherein if the angle of view control is performed based on the at least one threshold and the at least one threshold is less than the predetermined value, the angle of view control is performed in the second control mode.

4. The control apparatus according to claim 1,
wherein if the angle of view control is performed based on the size of the object and the size of the object is greater than or equal to a predetermined value, the angle of view control is performed in the first control mode, and
wherein if the angle of view control is performed based on the size of the object and the size of the object is less than the predetermined value, the angle of view control is performed in the second control mode.

5. The control apparatus according to claim 1,
wherein if the angle of view control is performed based on the target position and a distance between the target position and a center position of the angle of view is greater than or equal to a predetermined value, the angle of view control is performed in the first control mode, and
wherein if the angle of view control is performed based on the target position and the distance between the target position and the center position of the angle of view is less than the predetermined value, the angle of view control is performed in the second control mode.

6. The control apparatus according to claim 1,
wherein the instructions further cause the one or more processors to set a target size of the object,
wherein if the angle of view control is performed based on the target size of the object and the target size is greater than or equal to a predetermined value, the angle of view control is performed in the first control mode, and
wherein if the angle of view control is performed based on the target size of the object and the target size is less than the predetermined value, the angle of view control is performed in the second control mode.

7. A control apparatus configured to control an angle of view of an imaging apparatus, the control apparatus comprising:
one or more processors; and
one or more memories coupled to the one or more processors, the one or more memories storing instructions that, when executed by the one or more processors, cause the one or more processors to
acquire an image captured by the imaging apparatus,
detect an object from the image, and
perform angle of view control on the imaging apparatus based on a difference between a position of the object in the image and a target position in the image,
wherein whether to perform the angle of view control is determined based on the difference and at least one threshold for the difference, and
wherein the angle of view control is performed by switching a plurality of control modes where control speed of the angle of view control is different based on any of a size of the object, the target position, and the at least one threshold,
wherein whether to quit the angle of view control is determined based on the difference and the at least one threshold, and
wherein the at least one threshold includes a first threshold and a second threshold different from the first threshold, the first threshold being intended to determine whether to perform the angle of view control, the second threshold being intended to determine whether to quit the angle of view control.

8. The control apparatus according to claim 7, wherein the second threshold is less than the first threshold.

9. The control apparatus according to claim 7,
wherein if the second threshold is less than the first threshold, the angle of view control is performed in a first control mode, and
wherein if the second threshold is greater than or equal to the first threshold, the angle of view control is performed in a second control mode.

10. A control method for controlling an angle of view of an imaging apparatus, the control method comprising:
acquiring an image captured by the imaging apparatus;
detecting an object from the image; and
performing angle of view control on the imaging apparatus based on a difference between a position of the object in the image and a target position in the image,
wherein whether to perform the angle of view control is determined based on the difference and at least one threshold for the difference,
wherein the angle of view control is performed by switching a plurality of control modes where control speed of the angle of view control is different based on at least one of a target size of the object, the target position, and the at least one threshold, and
wherein the plurality of control modes includes a first control mode where the angle of view control is performed based on the difference at a first angle of view control speed and a second control mode where the angle of view control is performed based on the difference at a second angle of view control speed lower than the first angle of view control speed.

11. The control method according to claim 10, wherein the angle of view control on the imaging apparatus is performed if the difference is greater than the at least one threshold.

12. The control method according to claim 10,
wherein if the angle of view control is performed based on the at least one threshold and the at least one threshold is greater than or equal to a predetermined value, the angle of view control is performed in the first control mode, and wherein if the angle of view control is performed based on the at least one threshold and the at least one threshold is less than the predetermined value, the angle of view control is performed in the second control mode.

13. The control method according to claim 10, wherein if the angle of view control is performed based on a size of the object and the size of the object is greater than or equal to a predetermined value, the angle of view control is performed in the first control mode, and
wherein if the angle of view control is performed based on the size of the object and the size of the object is less than the predetermined value, the angle of view control is performed in the second control mode.

14. The control method according to claim 10, wherein if the angle of view control is performed based on the target position and a distance between the target position and a center position of the angle of view is greater than or equal to a predetermined value, the angle of view control is performed in the first control mode, and
wherein if the angle of view control is performed based on the target position and the distance between the target position and the center position of the angle of view is less than the predetermined value, the angle of view control is performed in the second control mode.

15. The control method according to claim 10, further comprising setting the target size of the object,
wherein if the angle of view control is performed based on the target size of the object and the target size is greater than or equal to a predetermined value, the angle of view control is performed in the first control mode, and
wherein if the angle of view control is performed based on the target size of the object and the target size is less than the predetermined value, the angle of view control is performed in the second control mode.

16. A non-transitory computer-readable storage medium storing a program for causing a computer to execute a method for controlling an angle of view of an imaging apparatus, the method comprising:
acquiring an image captured by the imaging apparatus;
detecting an object from the image; and
performing angle of view control on the imaging apparatus based on a difference between a position of the object in the image and a target position in the image,
wherein whether to perform the angle of view control is determined based on the difference and at least one threshold for the difference,
wherein the angle of view control is performed by switching a plurality of control modes where control speed of the angle of view control is different based on at least one of a target size of the object, the target position, and the at least one threshold, and
wherein the plurality of control modes includes a first control mode where the angle of view control is performed based on the difference at a first angle of view control speed and a second control mode where the angle of view control is performed based on the difference at a second angle of view control speed lower than the first angle of view control speed.

* * * * *